June 6, 1944.         E. ELLSTROM, SR         2,350,394
GAUGE FOR SETTING INTERNAL INSTRUMENTS
Filed Feb. 16, 1942
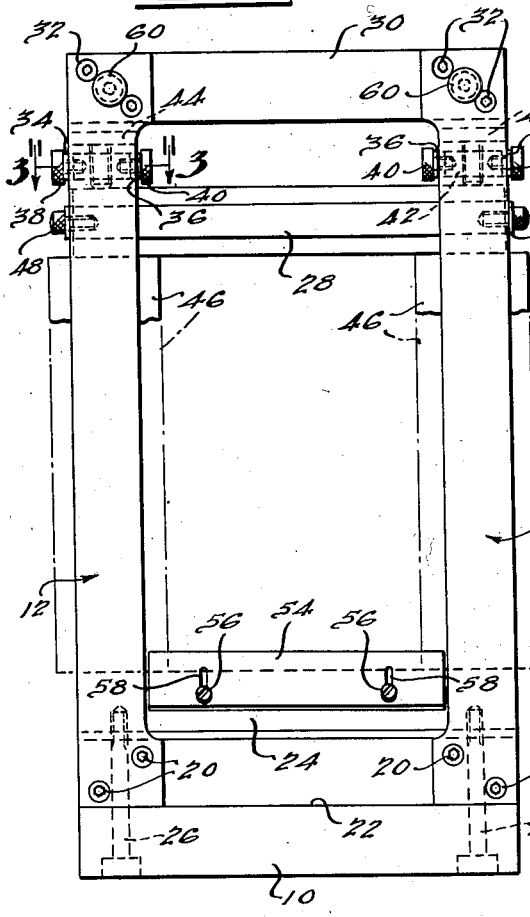
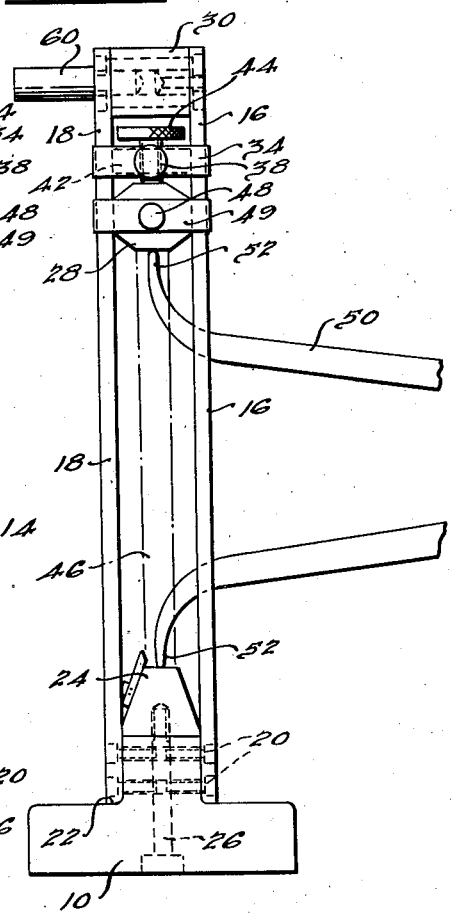
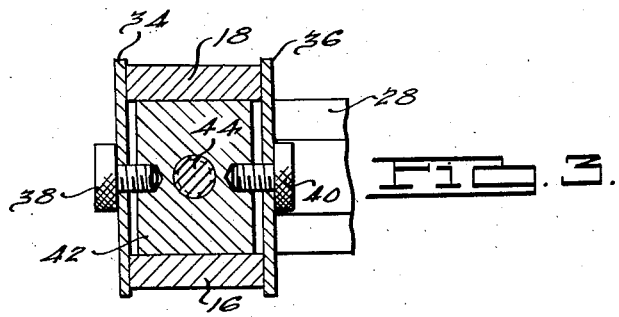
INVENTOR
Elmer Ellstrom, Sr.
BY
Gray and Smith
ATTORNEYS.

Patented June 6, 1944

2,350,394

UNITED STATES PATENT OFFICE 2,350,394

GAUGE FOR SETTING INTERNAL INSTRUMENTS

Elmer Ellstrom, Sr., Dearborn, Mich.

Application February 16, 1942, Serial No. 431,075

5 Claims. (Cl. 33—168)

This invention relates to gauges and more particularly to a precision instrument whereby internal measuring instruments may be accurately set. Considerable difficulty has heretofore been experienced in accurately setting precision instruments particularly of the internal caliper type for measuring inside diameters or for measuring distances between objects having substantially parallel confronting surfaces.

Standard precision gauge blocks, which may be rectangular or square, are commonly used in industry for accurately measuring distances and setting instruments of various types. Accurate setting of inside calipers from such gauge blocks has heretofore been difficult to secure.

An object of the present invention is therefore to provide an instrument whereby inside measuring calipers may be accurately set from gauge blocks.

A further object of the invention resides in the provision of a readily controlled precision instrument for accurately setting inside measuring instruments from devices such as precision gauge blocks having fixed external dimensions.

Another object is to provide an instrument setting device having smooth external surfaces adapted to engage opposed surfaces of gauge blocks whereby inside measuring instruments may be accurately set to conform to the distance between the opposed surfaces of the gauge block.

A further object of the invention resides in the provision of a universally adaptable instrument to enable an operator to accurately set inside measuring instruments from gauge blocks having parallel spaced surfaces.

Another object is to provide a precision caliper setting instrument having a fixed and a relatively movable confronting smooth surface adapted for precision adjustment to engage precision gauge blocks between them to provide an accurately spaced distance between them representing a spaced precision measurement of the selected external dimension of a precision gauge block or plurality of blocks.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a front elevation of a device embodying the present invention;

Fig. 2 is an end elevation of the device illustrating the use of the instrument in setting inside measuring calipers; and Fig. 3 is a sectional view taken substantially on the line 3—3 of Fig. 1, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring now to Fig. 1, it will be observed that a base 10 is provided with spaced standards 12 and 14 having front and back substantially parallel members 16 and 18 as more clearly illustrated in Fig. 3. The members 16 and 18 of each of the spaced standards 12 and 14 are securely attached to the base member 10 by suitable fastening means 20 to accurately maintain them perpendicular with an upper surface 22 of the base member 10. The upper surface 22 is accurately machined to provide a flat surface above which the standards 12 and 14 project at right angles. A bar 24 having parallel upper and lower surfaces may be secured to the base member 10 in engagement with the surface 22 by suitable fastening means 26. The bar 24, as shown, see Fig. 2, has opposite side faces which slope or converge inwardly toward the top or upper surface of said bar. This bar is preferably formed with a precision surface thereon which is protected by plating with a hard wear-resisting metal, such for example as chromium.

A relatively movable bar 28 is movably mounted between the front and back members 16 and 18 of each of the spaced standards 12 and 14 to move toward or away from the relatively fixed bar 24 carried by the base member 10. The movable bar 28 is also formed with a precision surface spaced from and parallel to the precision surface on the bar 24. This surface is similarly protected by plating with a hard wear-resisting metal such as chromium.

The front and back members 16 and 18 of the spaced standards 12 and 14 provide a relatively rigid structure which maintains the confronting surfaces of the bars 24 and 28 in a precision adjusted parallel relation to each other. It will be noted that the members 16 and 18 of the standards 12 and 14 may if desired be operably connected at their upper ends as illustrated in Figs. 1 and 2 by an upper bracket 30 attached by suitable fastening means 32.

Means may be provided to accurately adjust and fasten the movable bar 28 in any desired vertical position on the standards 12 and 14 to vary the spacing between the lower and upper surfaces of the relatively movable and fixed bars 28 and 24 respectively. One illustrative example of such adjusting and fastening means comprises a plurality of spaced brackets 34 and 36 engaging the edges of the front and back members 16 and 18 of each of the standards 12 and 14. Each of the spaced brackets 34 and 36 is provided with a thumb screw 38 and 40 respectively adapted to project into a vertically movable block 42 interposed between the front and back members 16 and 18 of each of the standards 12 and 14. A thumb screw 44 is threaded through each of the vertically movable blocks 42 and is adapted to engage the upper surface of the movable bar 28 to provide an accurate vertical adjustment within precision limits for each of the ends of the bar 28 relative to the fixed bar 24.

In the operation of this device a standard precision gauge or measuring block or blocks 46, which may be rectangular (as shown) or square, are positioned on the upper surface of the relatively fixed bar 24 as illustrated in Figs. 1 and 2. The thumb screws 38 and 40 are loosened to permit free vertical movement of the clamping brackets.

The relatively movable bar 28 is positioned in engagement with the upper surface of the gauge block or blocks 46 as illustrated in Figs. 1 and 2. The adjusting brackets are then positioned in engagement with the upper surface of the movable bar 28 and the thumb screws 38 and 40 are tightened to clamp the movable block 42 in a fixed vertical position relative to the front and back members 16 and 18 of the spaced standards 12 and 14. The thumb screws 44 are then actuated to exert a downward force on the movable bar 28 to exert a compressive force on the gauge block 46. This effects a precision adjustment of the movable bar 28 to such an extent that the space between the opposed parallel surfaces of the movable bar and the fixed bar is coextensive within precision limits with the dimension of the precision gauge block used in making the adjustment. When the thumb screws 44 have been adjusted to exert a desired compression force on the gauge blocks 46, clamping screws 48 positioned at the ends of the movable bar 28 may be tightened to clamp the brackets 49 relative to the members 16 and 18 and lock the movable bar 28 to the standards 12 and 14.

The gauge blocks 46 are preferably kept in place as illustrated in Figs. 1 and 2. Inside calipers 50 having adjustable outwardly directed projections 52 (see Fig. 2) may be introduced between the opposed precision surfaces of the fixed bar 24 and the movable bar 28 and manipulated to induce the projections 52 to exert a substantially predetermined pressure on the spaced confronting surfaces of the bars 24 and 28. The calipers will then be accurately set to measure within precision limits distances corresponding to the dimension of the precision gauge block 46 used in setting the device.

It will be understood of course that one or more gauge blocks may be introduced between the confronting surfaces of the bars 24 and 28 because it is common practice to apply one gauge block to another to build up a desired precision measurement.

As shown in Figs. 1 and 2, a guide plate 54 may be carried by the fixed bar 24 to facilitate placing the projection 52 of the calipers 50 into engagement with the upper surface of the fixed bar 24 both laterally and longitudinally thereof. If desired, a similar guide plate may be carried by the movable bar 28 to aid in positioning the calipers in a substantially predetermined position relative to the fixed and relatively movable bars employed in setting the calipers.

The guide plate 54 may be applied to the bars by means of a screw or screws 56, each thereof passing through a slot or elongated aperture 58 whereby the guide plate 54 may be moved to a substantially inoperative or unobstructing position by loosening the screws 56 and sliding the plate 54 to position the screws 56 in the opposite ends of the slots or apertures 58.

If desired, my improved caliper setting instrument may be positioned for use in a substantially horizontal position rather than in the vertical position illustrated. The upper bracket 30 is preferably provided with laterally extending projections or studs 60 aligned with the end surface of the base 10 and extending laterally approximately the same distance as the base 10 as illustrated in Fig. 2. When positioned in the horizontal plane the operation of the instrument is substantially the same as discussed above wherein the instrument is used in the vertical position. The construction herein disclosed thus may be used in either position without affecting the precision dimensions for which the gauge has been adjusted.

I claim:

1. A precision gauge comprising a base, spaced standards having front and back members carried by the base, a fixed bar having a smooth surface carried by the base, a movable bar carried by the front and back members of the spaced standards, an instrument locating bracket adjustibly secured at one longitudinal edge of the said fixed bar and extending an adjusted distance above the face thereof, the fixed and movable bars having confronting smooth parallel surfaces adapted to receive a gauge block, manually operable means to move the movable bar into engagement with the gauge block, clamping means to lock the movable bar relatively to the front and back members of the spaced standards whereby internal measuring instruments may be accurately set to the measurement of the gauge block when in contact with the surface of the fixed bar adjacent the said instrument locating bracket and in contact with the parallel surface of the movable bar.

2. A precision gauge for setting internal measuring instruments comprising a framework having spaced parallel guideways secured at one end to a base and at the opposite end to a top frame member, a bar slidably mounted in the guideways, a fixed bar secured to said base, the slidable bar and the fixed bar having confronting parallel smooth surfaces adapted to engage a precision gauge block in a precision contact, manually operable means to urge the slidable bar into contact with a gauge block to provide a fixed space between said parallel guideways in which internal measuring instruments can be accurately set to the dimensions of the gauge block by contact with said confronting parallel surfaces, and an adjustable stop secured to said fixed bar along one longitudinal face thereof and adapted to limit the movement of a portion of a tool within predetermined portions of the precision surface on said fixed bar.

3. A precision gauge comprising two substantially parallel spaced side frame members of equal length, each secured at one end to a base, and at its opposite end to a top frame member, the said base, side and top frame members comprising an open generally rectangular frame, a fixed smooth surfaced precision gauge bar secured to said base, a movable smooth surfaced precision gauge bar slidably mounted on said side frame members, and maintained in parallel relation to the said fixed gauge bar, a precision adjusting member adjacent each end of said movable bar and adapted to effect a precision contact between said movable bar and a precision gauge block supported by the said fixed bar, and means for locking said movable bar in its adjusted position.

4. A precision gauge as claimed in claim 3 and further characterized in that the said base extends outwardly and substantially at right angles to the front and back faces of the said side frame members to provide a support for the gauge.

5. A precision gauge to facilitate the precision setting of internal calipers or the like and comprising a base, spaced standards having front and back members carried by the base, a fixed bar carried by the base, a movable bar carried by the front and back members of the spaced standards, the fixed and movable bars having smooth confronting parallel surfaces lying within the area bounded by said spaced standards and adapted to contact a precision gauge block at points adjacent each end of said surfaces, manually operable means to move the movable bar into precision engagement with gauge blocks interposed between said movable bar and said base, and clamping means to lock the movable bar to the front and back members of the spaced standards to provide a space of fixed and accurate dimensions corresponding to the measurement of the interposed gauge blocks, thereby providing an area of precision dimensions between the confronting parallel surfaces of the fixed and movable bars.

ELMER ELLSTROM, Sr.